No. 773,603. PATENTED NOV. 1, 1904.
J. S. SOUTHERDEN.
TYPE INKING APPARATUS FOR TYPE WRITING MACHINES.
APPLICATION FILED JULY 22, 1903.
NO MODEL. 3 SHEETS—SHEET 1.

Witnesses:
James M. Tully
Peter J. Becker

Inventor:
John Stephen Southerden
By George Haseltine
Attorney.

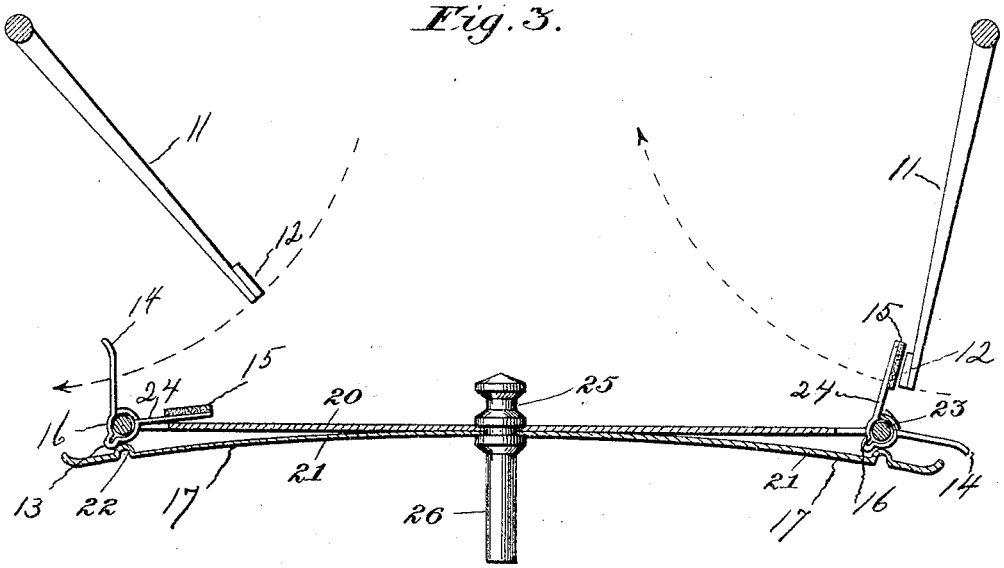
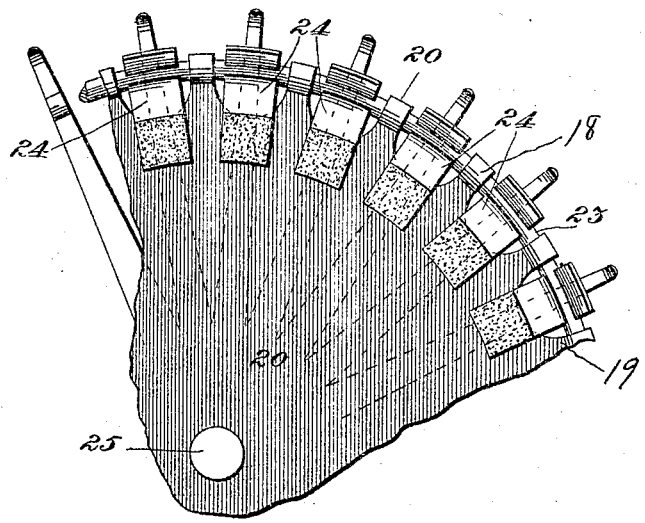

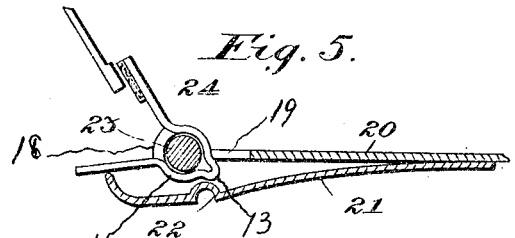
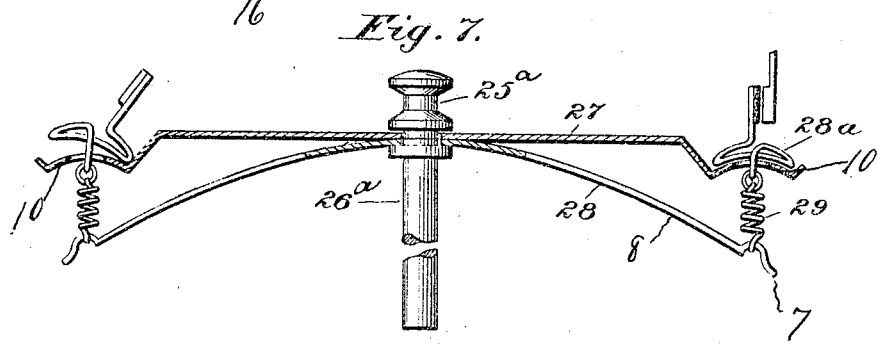
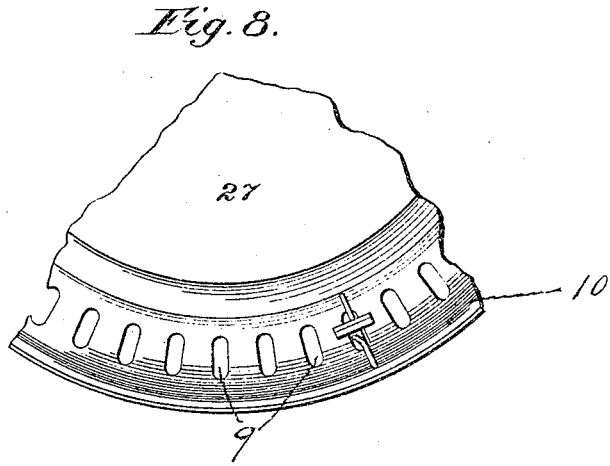

No. 773,603.

Patented November 1, 1904.

UNITED STATES PATENT OFFICE.

JOHN STEPHEN SOUTHERDEN, OF BRISBANE, QUEENSLAND, AUSTRALIA.

TYPE-INKING APPARATUS FOR TYPE-WRITING MACHINES.

SPECIFICATION forming part of Letters Patent No. 773,603, dated November 1, 1904.

Application filed July 22, 1903. Serial No. 166,639. (No model.)

*To all whom it may concern:*

Be it known that I, JOHN STEPHEN SOUTHERDEN, a subject of the King of Great Britain and Ireland, and a resident of 159 Queen street, Brisbane, in the State of Queensland, Commonwealth of Australia, have invented a certain new and useful Type-Inking Apparatus for Type-Writing Machines, of which the following is a specification.

This invention relates to type-inking apparatus for type-writers, and has for its object the provision of an inking apparatus which will dispense with the use of ribbons and the necessary mechanism for operating same and accomplished by a novel manner of presenting to each type an individual inking-pad, as will be hereinafter more fully described.

In describing the invention in detail reference will be had to the accompanying drawings, in which corresponding characters of reference will denote corresponding parts in the several views, in which—

Figure 1:
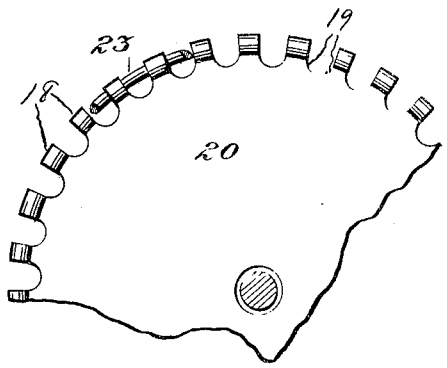
Figure 2:
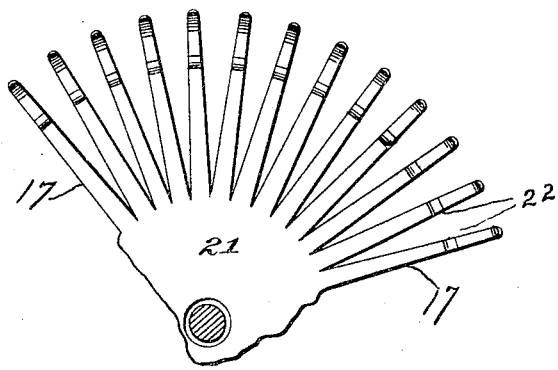
Figure 4:
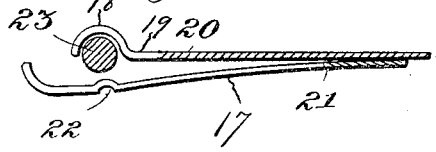

Figure 1 is a fragmentary plan view of the top plate forming part of my invention. Fig. 2 is a fragmentary plan view of the second plate. Fig. 3 is a side elevation of my invention in applied position, partly in section. Fig. 4 is an enlarged fragmentary section of my invention partly assembled. Fig. 5 is the same as Fig. 4, with the addition of the inking-pads shown in applied position. Fig. 6 is a fragmentary plan view of the invention assembled, part of the second plate being shown in dotted lines. Fig. 7 is a side elevation, partly in section, of a modified form of my invention; and Fig. 8 is a fragmentary top plan view of the top plate used in my modified form.

In the drawings, 20 denotes a circular plate with the short arms 19 at regular distances on its periphery, the ends of said arms being bent to form hooks 18. Under the plate 20 is a circular plate 21, having resilient radial arms 17 extending therefrom, the arms 17 being in equal number to the arms 19 of the plate 20. The arms 17 are positioned between the arms 19 and have raised projections 22 near their ends, said projections 22 being concentric with the hooks 18, and within the hooks 18 a wire 23 is fitted. The plates 20 and 21 are secured together on a spindle 26, and said spindle is secured in any suitable manner to the frame of the machine (not shown) and positioned with relation to the type.

The inking-pad carriers 24 are formed, preferably, of strips of sheet metal bent approximately centrally to produce sockets 16, which form seats for the wire 23, on which the said type-carriers are pivoted. The carriers are approximately the shape of a bell-crank, and one end of each carrier has attached thereto an inking-pad 15, and the opposite end 14 is rounded. The socket 13 is provided with a heel 13, which is adapted to engage and ride over the raised portion 22 on the arm 17. The engagement of the heel and raised portion serves to retain the carrier in either of the positions shown in Fig. 3, and also affords sufficient resistance to the movement of said carrier to insure pressure of the type against the pad to cause a portion of the ink on the pad to be transferred to the type.

In operation normally the ink-pad 15 is in an upright position and is adapted to be in alinement with the type 12 on the bar 11 of the machine. When the pad is struck by the bar 11, the carrier is knocked over; but on the return the opposite end 14 of the carrier is contacted and serves to return the pad to its normal position. Each arm 17 being resilient bears upward upon the heel 13 of the carrier and locks it in its different positions and prevents any accidental displacement of the pad, also insuring sufficient pressure of the type against the pad to cause a portion the ink of the pad to be transferred to the said type, as hereinbefore stated. The rounded portion 14 of the carrier is to permit a camming action of the type-bar 11 on its return.

In Figs. 7 and 8 is shown a modified form of my invention. The top circular plate has near its edge an annular seat 10, provided with radially-disposed oblong holes 9. Under the plate 27 is a dome-shaped plate 28, having radial arms 8, terminating in hooks 7. The plates 27 and 28 are suitably secured to a spindle 26ª by the thumb-screw 25ª. The inking-pad carriers 28ª are formed of rigid metal, shaped and folded as illustrated in Fig. 7, the lower end of the carrier passing through one of the holes in the top plate and being secured by a spiral spring 29 to the hook 7 on one of the arms 8. The inking-pad carriers rock on the annular seat 10 and are moved by the type-bars in their oscillation, and permit the said type-bars to first engage and then ride over the said inking-pad carriers as they are moved by the force of the stroke.

Having fully described the invention, what I claim as new, and desire to secure by Letters Patent, is—

1. In a device of the character described, a plate, arms extending from its periphery, carriers pivoted between the arms, means for holding the carriers in proper position and inking-pads on the carriers.

2. In a device of the character described, a plate, carriers pivoted with relation to the plate, a second plate adapted to hold the carriers in proper position and inking-pads on the carriers.

3. In a device of the character described, a plate, arms extending from its periphery, a wire held by said arms, carriers pivoted on the wire between the arms, means for holding the carriers in proper position and inking-pads on the carriers.

4. In a device of the character described, a plate, arms extending from the plate and terminating in hooks, a wire held by the hooks, carriers pivoted to the wire, means for holding the carriers in proper position and inking-pads on the carriers.

5. In a device of the character described, a plate, carriers pivoted with relation to the plate, a second plate, arms on the second plate adapted to hold the carriers in proper position, and inking-pads on the carriers.

6. In a device of the character described, a plate, carriers pivoted with relation to the plate, a second plate, resilient arms on the second plate adapted to hold the carriers in proper position, and inking-pads on the carriers.

7. In a device of the character described, a plate, carriers pivoted with relation to the plate, heels on the carriers, means for engaging the heels to hold the carriers in proper position and inking-pads on the carriers.

8. In a device of the character described, a plate, carriers pivoted with relation to the plate, heels on the carriers, a second plate, arms on the second plate having projections adapted to engage the heels of the carriers, and inking-pads on the carriers.

9. In a device of the character described, a plate, carriers approximately the shape of a bell-crank, pivoted with relation to the plate, inking-pads on corresponding ends of the carriers, the opposite ends being rounded, and means for holding the carriers in proper position.

10. In a device of the character described, two circular plates, one above the other, suitably secured to a spindle, short arms on the top plate, carriers pivoted between the short arms, long arms on the bottom plate, said long arms being resilient and engaging the carriers on the top plate, and inking-pads on the carriers.

In witness whereof I have hereunto set my hand in presence of two witnesses.

JOHN STEPHEN SOUTHERDEN.

Witnesses:
E. NATHAN ABELL,
M. E. N. ABELL.